United States Patent [19]
Morton

[11] Patent Number: 6,078,424
[45] Date of Patent: Jun. 20, 2000

[54] APPARATUS FOR IMAGE DISPLAY UTILIZING LENTICULAR OR BARRIER SCREENS

[75] Inventor: Roger Roy Adams Morton, Penfield, N.Y.

[73] Assignee: Eastman Kodak Company, Rochester, N.Y.

[21] Appl. No.: 09/114,356

[22] Filed: Jul. 13, 1998

[51] Int. Cl.$^7$ .............................. G02B 27/22; G03B 23/08
[52] U.S. Cl. ............................................. 359/463; 359/477
[58] Field of Search ..................................... 359/443–463, 359/478, 466, 477, 619; 353/7, 15, 32, 79, 10, 38; 434/365

[56] References Cited

U.S. PATENT DOCUMENTS

| | | | |
|---|---|---|---|
| 3,814,513 | 6/1974 | Nims et al. | 353/7 |
| 5,757,545 | 5/1998 | Wu et al. | 359/463 |
| 5,803,564 | 9/1998 | Bruinsma et al. | 353/10 |

Primary Examiner—Safet Metjahic
Assistant Examiner—Etienne LeRoux
Attorney, Agent, or Firm—William F. Noval

[57] ABSTRACT

An apparatus is provided that includes at least one of a lenticular screen and a barrier screen, an image bearing member, and flexures coupled to the screen and the image bearing member that permit relative movement between the screen and the image bearing member. In one embodiment, an image retaining member is provided that includes a slot that receives the image bearing member. In this case, the flexures are coupled to the image bearing member via the image retaining member. A mechanism is provided to supply audio that is synchronized to the movement of the image bearing member relative to the screen. The audio is generated from audio data that is either stored on the image bearing member or on a separate storage medium. The audio data can be stored in magnetic form, optical form or as digital data in a semiconductor memory device. Accordingly, the observer is provided with audio that is synchronized with the image display. Still further, a keying mechanism is provided so that image bearing members of a given set of image bearing members can only be utilized with a display unit that corresponds with the given set.

3 Claims, 6 Drawing Sheets

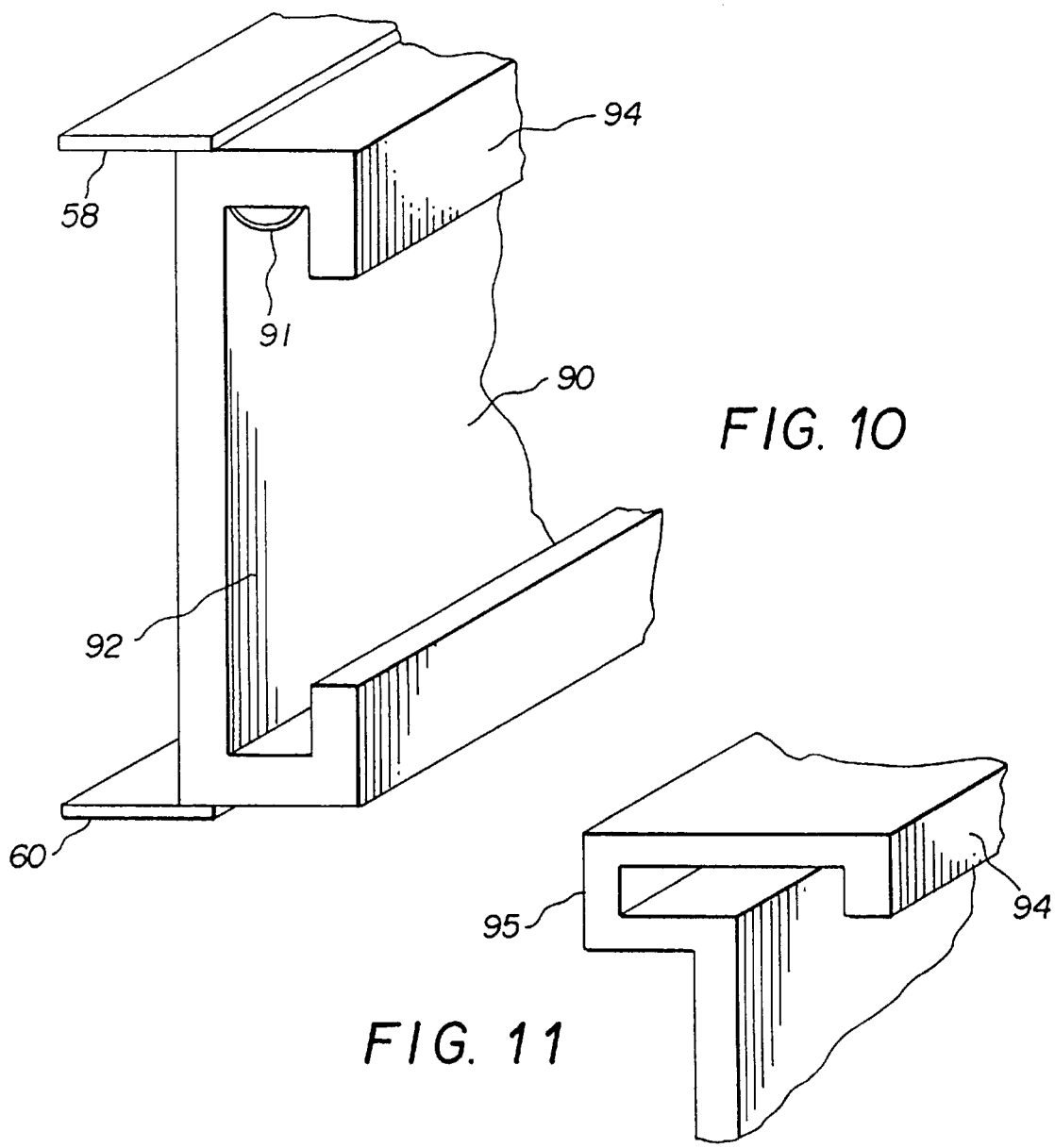
FIG. 10
FIG. 11
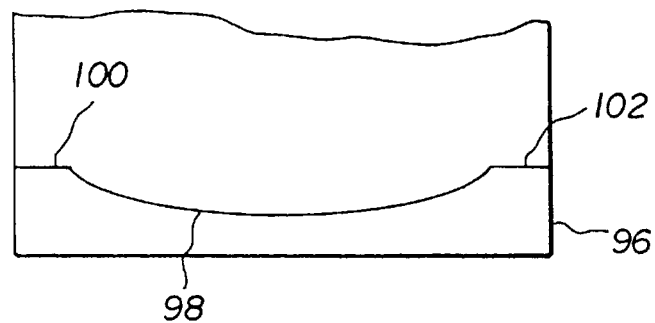
FIG. 12

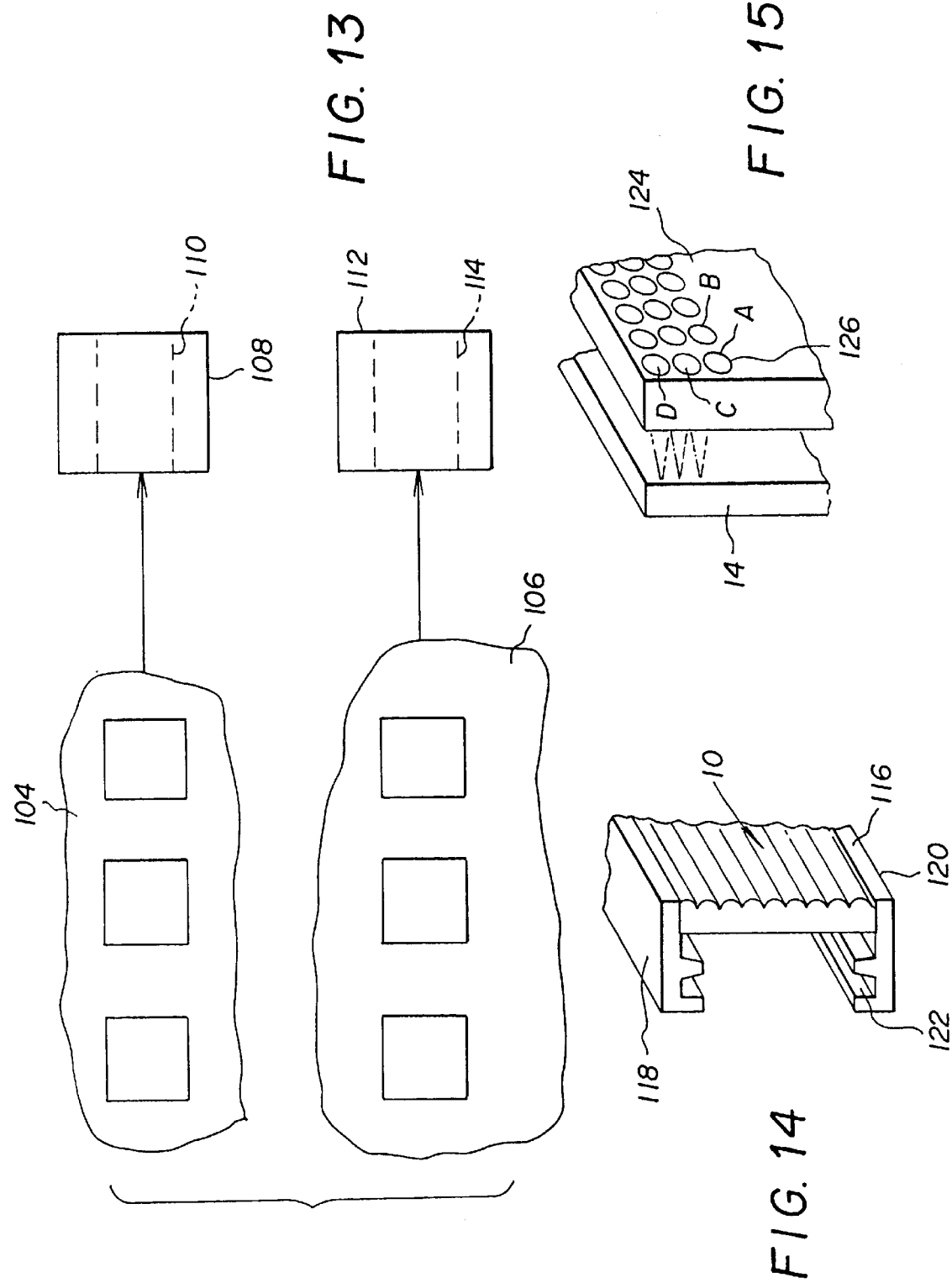

APPARATUS FOR IMAGE DISPLAY UTILIZING LENTICULAR OR BARRIER SCREENS

FIELD OF THE INVENTION

The invention relates generally to the display of motion images or other multi-view images including depth and other effects using lenticular or barrier techniques. More specifically, the invention relates to devices for displaying interchangeable image receiving members that utilize lenticular or barrier screens for image display, to devices that provide synchronization of audio with image display, and to devices that significantly increase the number of images that can be displayed.

BACKGROUND OF THE INVENTION

Lenticular imaging techniques provide a method for displaying short motion sequences and numerous other effects by manually or mechanically tilting a lenticular image unit to show a motion image. The lenticular image unit includes a lenticular screen that is bonded to an image bearing member. It is desirable, however, to provide the lenticular screen as a separate element from the image bearing member, thereby enabling the use of interchangeable non-bonded image bearing members in display devices incorporating the lenticular screen. In the case of non-bonded image bearing members, image display is accomplished by moving the lenticular screen with respect to the image bearing member.

With the advent of high resolution, ultra high precision lenticular imaging techniques, however, a need has arisen to provide a display mechanism that provides accurate registration of the image bearing member with respect to the lenticular screen during movement. It would further be desirable to provide additional features that would enhance consumer acceptance of non-bonded display techniques including, for example, providing for interchangeability of image bearing members, providing for audio in synchronization with image display, and increasing the number of images that are provided on the image bearing member to provide a longer motion sequence.

SUMMARY OF THE INVENTION

Briefly summarized, according to one aspect of the present invention, an apparatus is provided that includes at least one of a lenticular screen and a barrier screen, an image bearing member, and flexures coupled to the screen and the image bearing member that permit relative movement between the screen and the image bearing member. The flexures preferably includes a first pair of flexures having a first flexure coupled to a first edge of the screen and a second flexure coupled to a first edge of the image bearing member, and a second pair of flexures including a first flexure coupled to a second edge of the screen and a second flexure coupled to a second edge of the image bearing member. The first flexure of the first pair of flexures is coupled to the second flexure of the first pair of flexures by a first spacing member, and the first flexure of the second pair of flexures is coupled to the second flexure of the second pair of flexures by a second spacing member. The screen is retained by a retaining structure that may include a first stationary member coupled to a first edge of the screen and a second retaining structure coupled to a second edge of the screen. The retaining structure may be incorporated as part of a frame of a display device.

In one preferred embodiment, an image retaining member is provided that includes a slot that receives the image bearing member. In this case, the flexures are coupled to the image bearing member via the image retaining member. A bottom surface of the slot preferably includes a recessed portion that traps dirt. Further, a top portion of the image retaining member includes a mechanism, either in the form of a separate spring or a spring element molded as part of the top portion, that applies force to the image bearing member to register the image bearing member against a bottom surface of the slot.

The image bearing member is preferably spaced from the screen by a given distance that is maintained by the flexures. However, a surface of the image bearing member can be brought into contact with a surface of the screen. In such cases, it is desirable to include a low friction layer between the surface of the image bearing member and the surface of the screen.

A motorized or manual mechanism is provided to provide movement between the image bearing member relative to the sheet. In one embodiment, a cam is driven by a shaft and a rod that rides on the cam and imparts motion to the image bearing member. An adjustment mechanism is also provided to permit movement of the rod to adjust the location of the image bearing member.

In a further preferred embodiment, a mechanism is provided to supply audio that is synchronized to the movement of the image bearing member relative to the screen. The audio is generated from audio data that is either stored on the image bearing member or on a separate storage medium. The audio data can be stored in magnetic form, optical form or as digital data in a semiconductor memory device. Accordingly, the observer is provided with audio that is synchronized with the image display.

In a still further embodiment, the screen is a lenticular screen that includes an array of discrete lens elements. The image bearing member is also provided with an array of discrete images. The movement of the image bearing member with respect to the lenticular screen is controlled such that the discrete images are scanned by the array of discrete lens elements. The provision of the array of discrete images greatly increases the number of images that can be provided in a motion sequence. Further, an array of virtual discrete lens elements can be provided utilizing a front lenticular screen including a plurality of cylindrical lens elements and a back lenticular screen including a plurality of cylindrical lens elements that are arranged at an angle to the cylindrical lens elements of the front lenticular screen.

Still further, a keying mechanism is provided so that image bearing members of a given set of image bearing members can only be utilized with a display unit that corresponds with the given set.

The present invention provides a number of advantages including: ensuring that the image stays in focus without touching the screen; supporting the movement of the image bearing member with respect to the screen without requiring sliding parts; providing audio synchronized to the motion; providing for interchangeability of image bearing members; linking images to sets so that only specific sets can be displayed; providing a significant increase in the number of images provided on the image bearing member; and compensating for viewer position.

These and other advantages will become apparent from the following detailed description of the preferred embodiments of the invention and the accompanying drawings.

BRIEF DESCRIPTION OF THE DRAWINGS

The invention will be described with reference to the following detailed description of the invention and the accompanying drawings, wherein:

FIG. 10 illustrates an image bearing member;

FIG. 11 illustrates a top portion of the image bearing member;

FIG. 12 illustrates a bottom portion of the image bearing member;

FIG. 13 illustrates a plurality of sets of image bearing members that are keyed to a plurality of display device;

FIG. 14 is a perspective view of a hand held viewer;

FIG. 15 is a perspective view of a lenticular sheet including an array of discrete lenses;

To facilitate understanding, identical reference numerals have been used, where possible, to designate identical elements that are common to the figures.

DETAILED DESCRIPTION OF THE INVENTION

Figure 1:
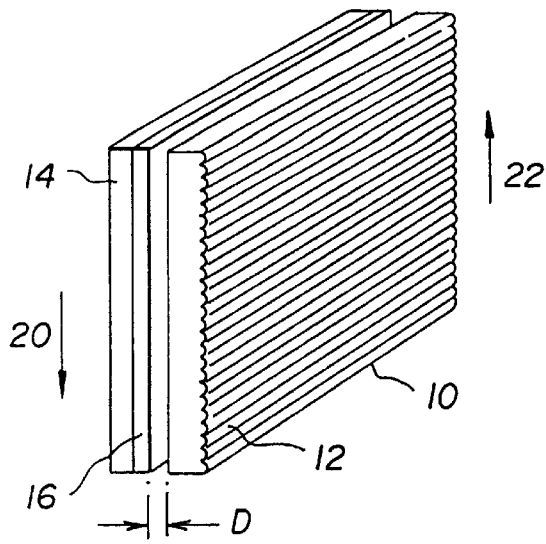
FIG. 1 is a perspective view of a lenticular screen and an image bearing member in accordance with the invention.

FIG. 1 illustrates a basic concept of motion display utilizing a lenticular screen 10, including a plurality of lenticules 12 comprising cylindrical lenses, that is positioned in front of an interchangeable image bearing member 14. An image layer 16 is provided on one surface of the image bearing member 14 that includes a sequence of images that can be viewed through the lenticular screen 10. Preferably, the image layer 16 falls near the focal point of the lenticules 12 consistent with a viewing distance of an observer's eye. In addition, the pitch of the lenticules 12 in relationship to the pitch of the views on the image layer 16 of the image bearing member 14 is consistent with the techniques explained in U.S. Pat. No. 5,276,478 issued to Morton. Techniques identified in U.S. Pat. Nos. 5,276,478; 5,231,797; 5,391,254; and 5,424,553 are also relevant with respect to the practice of the invention. It will be appreciated that, provided the focal requirement is satisfied, the image layer 16 may be placed on either side of image bearing member 14. Further, in order to prevent friction between the image bearing member 14 and the lenticular screen 10 during a display operation, a space (d) is preferably provided between the image bearing member 14 and the lenticular screen 10.

In order to view motion, the lenticular screen 10 and the image bearing member 14 are moved by a distance of one or more lenticular pitch in relationship with each other. For example, the image bearing member 14 is moved in the direction illustrated by arrow 20 or the lenticular screen 10 is moved in the direction illustrated by arrow 22. The observer will then observe a motion sequence, provided the two elements are moved in relationship with each other beginning at a preset starting point with accurate registration maintained and the image layer 16 contains a suitable motion sequence of images. The means for imparting relative motion to the lenticular screen 10 and the image bearing member 14 may include a mechanism incorporating an electric motor or piezeo-electric transducer, a spring driven mechanical device or a mechanism to allow the viewer to manually impart motion.

It will be appreciated that the lenticular screen 10 may be oriented horizontally so that each of the viewer's eyes will see the same scene. Alternatively, the lenticular screen 10 may be oriented at some other angle and the image bearing member 14 correspondingly adjusted so that each of the viewer's eyes will see a different scene. The two scenes may or may not have stereo visual correspondence. If stereo visual correspondence is provided, the viewer will have the appearance of depth as the image is viewed.

Figure 2:
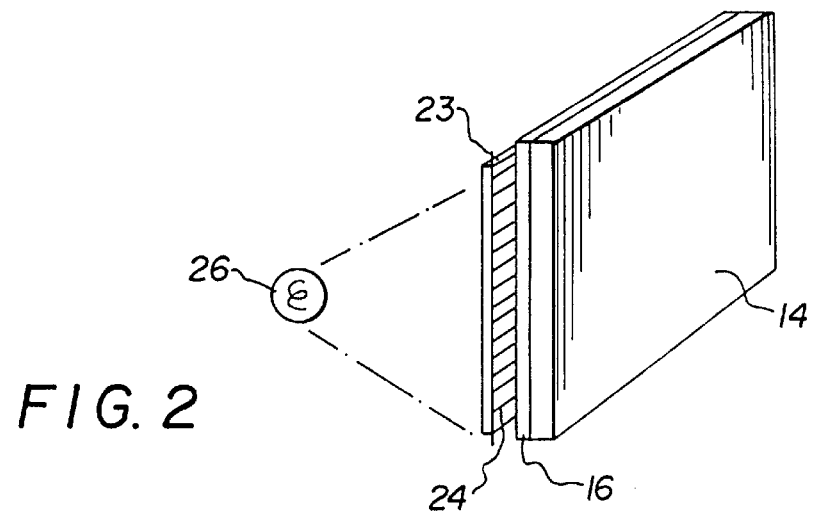
FIG. 2 is a perspective view of a barrier screen and an image bearing member.

In an alternative embodiment, barrier technology may be utilized to provide a barrier screen 23 having a series of slits 24 registered with the image layer 16 of the image bearing member 14, in conjunction with an illumination source 26, to illuminate the image layer 16 as shown in FIG. 2. The barrier screen 23 may be generated from a photosensitive material that is exposed to generate the slits 24. In this example, the screen 23 and image bearing member 14 are moved with respect to one another and the lenticular screen 10 is not employed.

Figure 3:
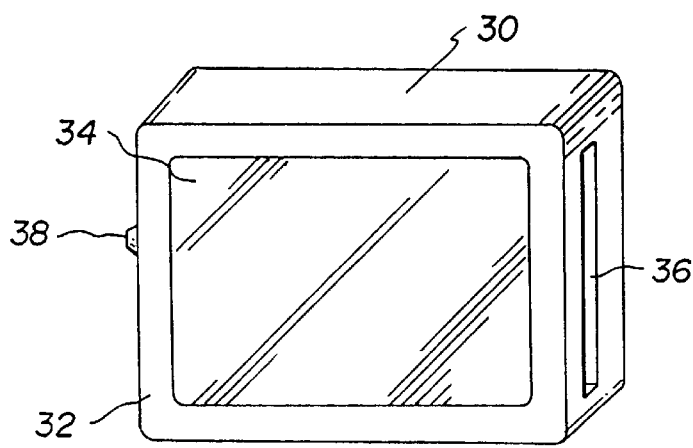
FIG. 3 illustrates a display device.

FIG. 3 illustrates a front view of a display device 30 for displaying interchangeable image bearing members 14 including a front frame 32 that acts as a border around viewing area 34. In the case of the embodiment illustrated in FIG. 1, the lenticular screen 10 is preferably provided within the viewer area 34 and a slot 36 is provided on a side of the display device 30 into which the image bearing member 14 is inserted for viewing. In the case of the embodiment illustrated in FIG. 2, the viewing area 34 may be open or a protective transparent screen may be provided therein, and the barrier screen 23 and illumination source 26 are located behind the slot into which the image bearing member 14 is inserted.

Although not illustrated in FIG. 3, the display device 30 preferably includes a motorized motion imparting mechanism that is controlled by an operator activation switch 38. Alternatively, the activation switch 38 is not provided and the display device 30 runs continuously as soon as power is supplied to the motorized motion imparting mechanism. Power is supplied to the display device 30 by batteries, by a power cord that is connected to an outlet or by any other suitable means including, for example, solar power cells.

The display device 30 may display reflective images, transmitted images or both. If transmitted images are to be displayed, the back of the display device 30 is preferably manufactured from a transparent or semi-transparent material to enable ambient light to illuminate the image. Alternatively, an illumination source is included within the display device 30 as in the case when the barrier screen 23 is utilized. The size of the viewing area 34 may exceed the range of 1×1 to 60×80 inches depending on the desired application.

Motion of the image layer 16 of the image bearing member 14 with respect to the lenticular screen 10 or barrier screen 23 may be continuous or may be cyclical. Continuous motion requires that the lenticular screen 10 be substantially larger than the image layer 16 if the image is not to change with motion. The image layer 16, however, may be larger than the lenticular screen 10, in which case an optical effect of the image drifting in position is provided to the observer. Still further, either the lenticular screen 10 or the imaging bearing member 14 may be flexible and wrapped into a belt such that it continuously rotates in one direction.

A key quality aspect of any lenticular display system is the number of individually discernible views. Increasing the number of motion views is performed by improving the resolution of the lenticules 12 in the lenticular screen 10 and improving the resolution of the imaging layer 16 of the image bearing member 14 especially in the direction that goes across the lenticules 12. Other key factors in contributing to increasing the number of discernible views include maintaining the spacing (d) between the lenticular screen 10 and image bearing member 14. It is important that the spacing be preferably maintained to better than 0.001 of an inch if a good quality image is to be achieved.

Figure 4:
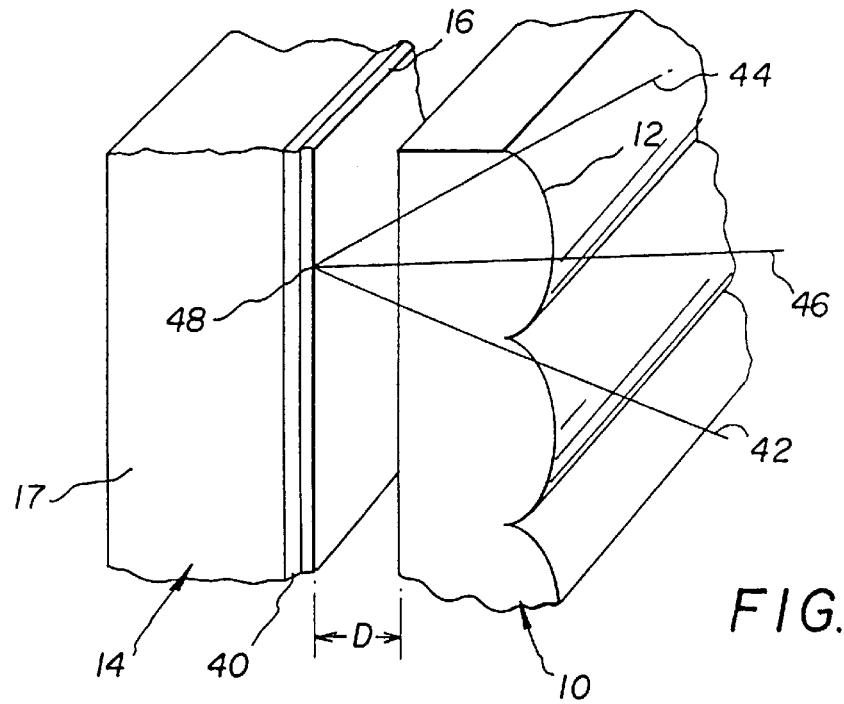
FIG. 4 is a partial side view of the lenticular screen and image bearing member.

Also, as shown in FIG. 4, a reflective layer 40 is provided behind the image layer 16 if a reflected image is utilized. It is very important that the depth of penetration of light into the reflective layer 40 be minimized. Light from a lenticule 12, characterized by rays 42 and 44, which focus on the imaging layer 16 passes into the reflective layer 40 a very small distance before being reflected out. It is desirable that this distance be less than the spacing between the scan lines written on the image layer 16 that correspond to the different views.

To ensure that the image stays in focus without touching the lenticular screen 10, the image layer 16 is preferably positioned against a thick support layer 17 of the image bearing member 14 (See FIG. 1). The lenticular screen 10 is preferably made slightly thinner so the distance (d) is maintained between the back of the planar lenticular screen 10 and the focal point of the lenticules 12. This is shown in FIG. 4 where image layer 16 falls at the focal point of lenticules 12 as defined from where light rays 42–46 emanate to be directed by the lenticules 12 to reach a distant focal point shown well outside the right hand side of the drawing. By making the support layer 17 of the image layer 16 arbitrarily thick, it may be given sufficient rigidity to prevent flexing, thereby maintaining an imaging surface which is equally spaced by distance (d) from the flat surface the lenticular screen 10. Focal point 48 of the ray bundle, which includes light rays 42–46, is therefore held at the same level.

Figure 5:
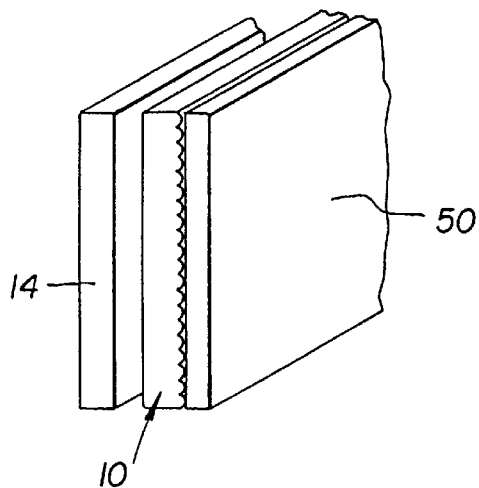
FIG. 5 is a side view of the lenticular screen and image bearing member incorporated with a plain screen.

In order to improve the rigidity of the lenticular screen 10, the thickness (t) of the lenticular screen 10 is preferably chosen so that it will not flex such as to change the distance (d). In addition, a plain transparent screen 50 may be provided in front of lenticular screen 10 and the image bearing member 14 as shown in FIG. 5 to prevent the observer from touching the lenticular screen 10 and causing it to flex, thereby changing the distance (d). The plain screen 50 may or may not be in contact with the lenticular screen 10.

Figure 6:
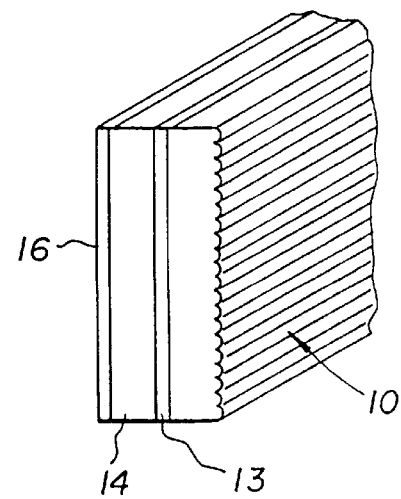
FIG. 6 is a side view illustrating the lenticular screen in contact with the image bearing member.

It is also preferably to maintain the distance (d) between the lenticular screen 10 and the image layer 16 to prevent stress from being imposed on the imaging layer 16 through hydroscopic expansion or contraction, which can occur with a gelatin based imaging layer. If it is desired to minimize material cost, however, it is possible to allow the image bearing member 14 and the lenticular screen 10 to contact as shown in FIG. 6. In such a case, it is preferably to put the image layer 16 on the back side of image bearing member 14. The total material cost is minimized because the sandwich thickness is defined by the focal point of the lenticules 12. In this case, it is preferable to put a clear Teflon™ or other low friction layer 13 in position between the lenticular screen 10 and the image bearing layer 14, although this is not absolutely required, to reduce friction between the two elements during motion display. The low friction layer 13 may be attached to either the lenticular screen 10 or the image bearing layer 14. Accordingly, any combination of image layer, image bearing member and lenticular screen position can be accommodated.

Figure 7:
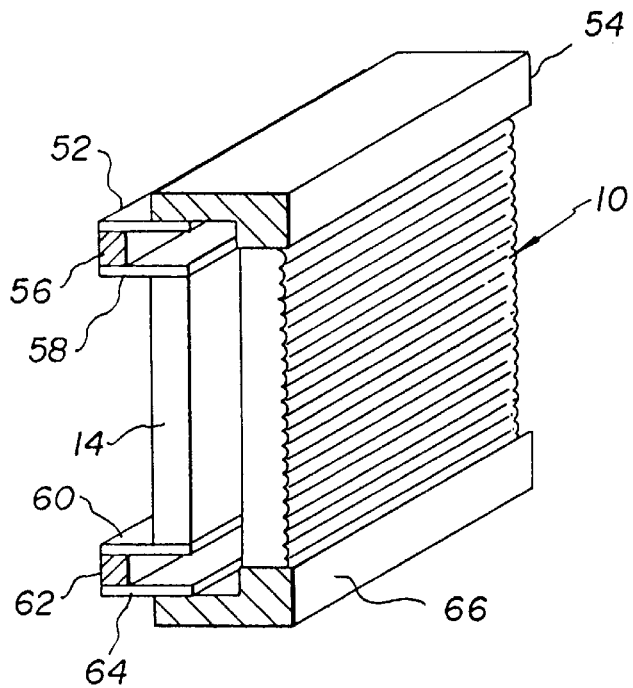
FIG. 7 is a side view illustrating flexures used to hold the image bearing member.

One method for moving the image bearing member 14 layer with respect to the lenticular screen 10 is to have one of the elements slide in a track while the other remains stationary. Although this method is appropriate when a considerable travel distance is required, such as in the aforementioned belt approach, a better approach is required if it is desired to move the image by just one lenticule (or a small number of lenticules). FIG. 7 illustrates an apparatus for providing motion is such cases to move the image bearing member 14 with respect to the lenticular screen 10. A flexure 52 comprising a thin layer of steel plastic or other material is anchored to stationary member 54 which is also attached to the lenticular screen 10. A spacer 56 connects the flexure 52 to a further flexure 58 which is connected to the image bearing member 14. Similarly, a flexure 60 is connected to image bearing member 14 and a spacer 62, and the spacer 62 is connected to a flexure 64 that is coupled to stationary member 66, which is also connected to the lenticular screen 10. Accordingly, in the illustrated embodiment, the flexures 52, 56 constitute a first pair of flexures and the flexures 60, 64 constitute a second pair of flexures that hold the image bearing member 14 in place. The stationary members 54, 66 may be incorporated as part of a display device, for example, the front frame 32 of the display device 30. The same flexure structure can be employed with the lenticular screen 10 replaced with the barrier screen 23.

The provision of the flexures permits the image bearing member 14 to move up and down with respect to lenticular screen 10 or barrier screen 23. Furthermore, the motion imparted to the image bearing member 14 is maintained parallel to the lenticular screen 10, thus maintaining distance (d), by ensuring that flexures 52, 64 are longer than flexures 58, 60 and stiffer in proportion to their length. Namely, the width w1 of flexure member 64, which is equal to the width of flexure 52, and the width w2 of flexure 60, which is equal to the length of flexure member 58, define a stiffness ratio of w1/w2 for flexure 64 with respect to flexure 60. Similarly, the ratio of stiffness of flexure 52 to flexure 58 is also w1/w2.

It should be noted that if the lenticular screen 10 is moved and the viewing distance is close to the lenticular screen 10, the actual focal length of the lenticules 12 will change with the change in viewing angle resulting from the motion. A change in focal distance can be accommodated by choosing appropriate stiffness ratios for the flexures. The stiffness ratio is set by selecting different materials for the flexures or giving the flexures different thicknesses.

Alternative embodiments are also possible. For example, in order to simplify the design, it is also possible to use one flexure at the top and one at the bottom to couple the image bearing member 14 to the stationary members holding the lenticular screen 10 instead of the double flexures illustrated. On larger display devices, it may also be desirable to add flexure assemblies on the sides.

Figure 8:
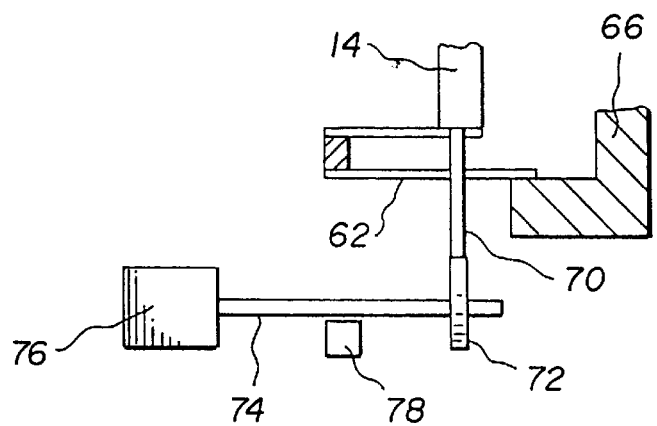
FIG. 8 illustrates a cam drive system for imparting motion to the image bearing member.

In one preferred embodiment, a cam is used to provide the relative motion between the image bearing member 14 and the lenticular screen 10. For example, as shown in FIG. 8, a finger or rod 70 is configured to pass through a hole in flexure 62 and contact the image bearing member 14. The rod 70 rests on a cam 72 that is driven by a shaft 74, which in turn is connected to a motor 76. Alternatively, the shaft 74 can be manually driven by a thumbwheel (not shown) operated by the operator. The cam 72 is preferably configured to cause the image bearing member 14 to quickly drop back down to the initial starting position once the motion sequence is completed, thereby providing a "blanking" effect between repeated displays.

It will be appreciated that in order to ensure that high quality motion or other effect is achieved, the total eccentricity of the cam 72 should equal one, two, or other integer numbers of lenticular pitch. Furthermore, the overall assembly should be such that at the end of the travel of the cam 72 corresponds to the view at the beginning or end of a motion sequence. These two requirements impose tight tolerance requirements on the assembly.

In a further preferred embodiment, audio data is provided that is synchronized to the imparted motion. The audio data may be stored in any desired form including magnetic tape, optically encoded data or data stored in a digital memory. Further, the audio data may be stored on either the image bearing member 14 or in a device that is separate from the image bearing member 14. For example, audio data can be stored on the image bearing member 14 in the form of a magnetic data strip, optically encoded data provided in the image layer 16 or in an EPROM or FLASH memory device attached to the image bearing member 14, with a corresponding audio reproduction device provided in the display unit 30 to playback the audio data. Alternatively, audio data is stored in a separate device, such as a compact disc, which may indexed to a plurality of image bearing members.

Figure 9:
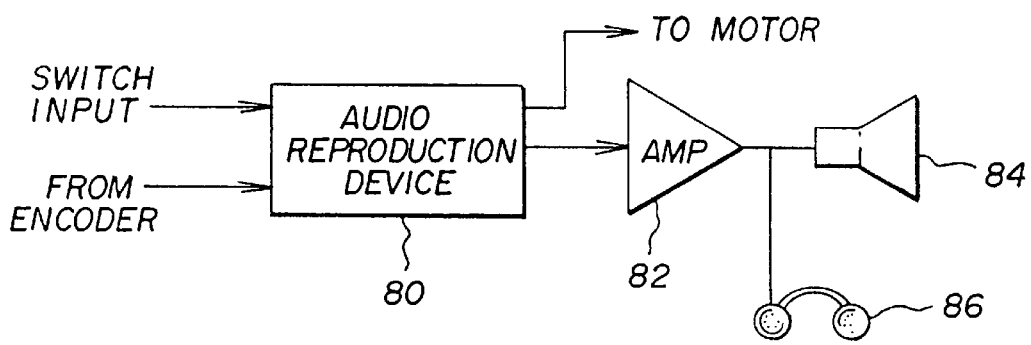
FIG. 9 illustrates a mechanism for providing synchronized audio.

Audio synchronization can be accomplished, for example, through the use of a shaft encoder assembly 78 (FIG. 8) that generates signals indicative of the movement of the shaft 74 which corresponds with the movement of the cam 72. The shaft encoder assembly 78 is implemented using optical, hall effect, mechanical contact, or other appropriate sensing means. The signal generated by the shaft encoder 78 is sent to an audio reproduction device 80 shown in FIG. 9, which begins audio reproduction in accordance with one of the methods described above. The output of the audio reproduction device 80 is supplied to an amplifier 82, which supplies an amplified signal to either a speaker 84 or head phones 86, thereby enabling the observer to hear audio that is synchronized to the image as the image moves. It will be understood that while the amplifier 82 is illustrated as a separate component, all required amplification may be incorporated within the audio reproduction device 80.

It should be appreciated that the speed of movement of shaft 74 needs to be sufficiently accurate to ensure that the sound remains synchronized with the motion once the movement has started. One way to ensure accurate synchronism between the sound and the motion is, for example, to have the audio unit 80 generate timing signals that are used to drive the motor 76 (preferably a stepper motor) connected to the shaft 74. In this case, an operator switch can be provided to send a signal to the audio unit 80 to initiate the display operation. The motor 76 then drives the cam 72 as previously described, or some other translation method, such as a friction drive, wire belt, or rack and pinion, may be used to translate the rotary motion of the motor 76 to the linear motion required to move image bearing member 14 with respect to the lenticular screen 10.

In order to provide for interchangeable of image bearing members 14, an image carrying member 90 is connected to the flexures as shown in FIG. 10 to couple the flexures to the image bearing member 14, instead of the direct coupling to the image bearing member 14 shown in FIG. 7. The image carrying member 90 includes a slot 92 into which the image bearing member 14 slides. In providing for interchangeable images, it is important to ensure that the image bearing member 14 is accurately placed (typically better than an accuracy of 0.001 inches). In order to ensure this, the top portion 94 of the image carrying member 90 preferably acts to press downward on the image bearing member 14 to register the image bearing member 14 to the bottom of the slot 92. The downward force can be accomplished by providing a leaf spring 91 on the top surface of the slot 92 located in the top portion 94, or the top portion 94 can be manufactured as shown in FIG. 11 to provide an integrated spring member 95. It will be appreciated that other techniques for accurately positioning the image bearing member 14 may be used such as tapering the image bearing member 14 either across its height, its width, or its depth, and having the slot 92 be provided with a similar taper.

The bottom 96 of the slot 92 is also preferably provided with a recessed area 98 as shown in FIG. 12 so that, as the bottom of the image bearing member 14 slides into the slot 92, any dirt on the reference surface 100 is pushed off by the image bearing member 14 into the recessed area 98. Further, dirt sitting on reference surface 102 is pushed away from the image bearing member 14.

It is desirable to group image bearing members into sets and ensure that only specific display units are capable of viewing image bearing members from the same set. Such keying of image bearing members to specific display units is accomplished in a number of ways including: custom sizing image bearing members of a particular set to fit only in particular display devices; utilizing different lenticular pitches for different sets of image bearing members that match specific lenticular pitches associated with given display units; and making the lenticular screen interchangeable as well as the image bearing members.

FIG. 13, for example, illustrates a first set 104 of image bearing members 14 having a width that is different from the width of the image bearing members 14 of a second set 106. A display device 108 is provided that has a slot 110 that corresponds to the width of the image bearing members of the first set 104. Similarly, a second display device 112 is provided that has a slot 114 that corresponds to the width of the image bearing members of the second set 106. The display device 108 cannot receive the image bearing members of the second set 106. Further, although the image bearing members of the first set 104 will slide into the slot 114 of the second display device 112, they will not properly register in the slot 114 and therefore cannot be properly viewed. Alternatively, the image bearing members of each set may be of the same size, but the lenticular pitches of each of the display devices is different so that only the proper image bearing members of corresponding sets can be viewed by a given display device. Combinations of various keying methods may also be employed.

In addition to the display device 30, a hand held viewer 116 for the display of interchangeable image bearing members 14 can be provided as shown in FIG. 14. The lenticular screen 10 is attached to frame elements 118 and 120. A slot 122 is provided into which interchangeable image bearing members 14 can be inserted. The observer can then view motion images by rocking the hand held viewer 116 back and forth.

Figure 16:
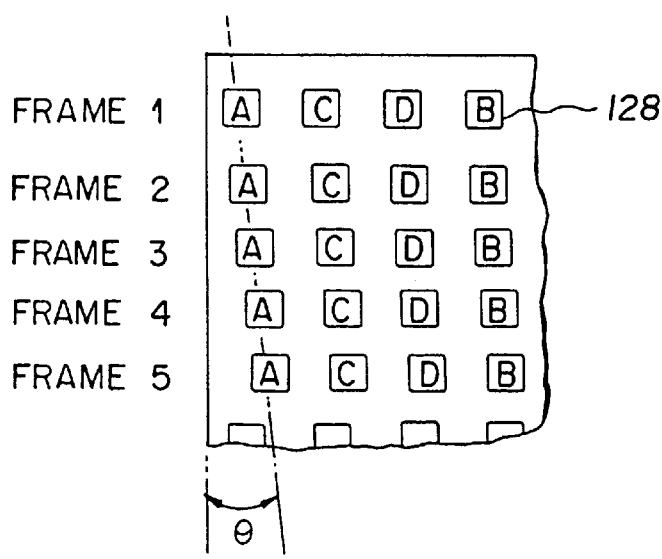
FIG. 16 illustrates the formation of an array of discrete images on the image bearing member.

The invention is not limited to the type of lenticular screens illustrated in FIG. 1. FIG. 15, for example, illustrates a front lenticular screen 124 comprising, rather than cylindrical lenses, a two dimensional array of individual discrete lenses 126 which focus individually to the imaging layer 16 on the image bearing member 14. In this embodiment, a two dimensional array of discrete picture elements 128 are provided on the image layer 16 as shown in FIG. 16 instead of the conventionally employed scan line images. The picture elements 128 are interleaved both in the horizontal and vertical directions, i.e. two dimensionally, as opposed to conventionally employed scan line images which are interleaved in only one direction. For example, the picture elements to be seen by Lens A of the lenticular screen 124 are marked with a pattern of A's, while the picture elements to be seen in lens B are marked with a pattern of B and so forth. The picture elements 128 are written at a slight angle, so that the motion imparted to the image bearing member 14 in this example must be upward and slightly to the left in order for a given lens to follow the corresponding picture elements. The imparted motion is considered to constitute a "helical" type scanning pattern. Alternatively, the picture elements 128s can be written in straight rows and columns and the discrete lenses 126 can be provided at the appropriate angle, so that the image bearing member 14 is not required to be moved at an angle with respect to the lenticular screen 124.

Assuming the picture element patterns are laid out at 1,500 to the linear inch, the individual discrete lenses are 1/50th of an inch apart and the motion of the image bearing member 14 is in the same direction as the line of A's, thirty of the image A views will be provided in the 50th of an inch between lens A and lens B. However, there will be also 30 possible viewing locations between and image A and an image B in the same horizontal position. Thus, by moving the imaging bearing member 14, it will be possible to have a string of nine hundred image A views each corresponding to a different frame as seen in the motion sequence. Generally however, there will need to be more separation between the A's and the B's than between adjacent A's, so it may be desirable to have thirty views vertically but only twenty views horizontally providing just six hundred consecutive views.

Figure 17:
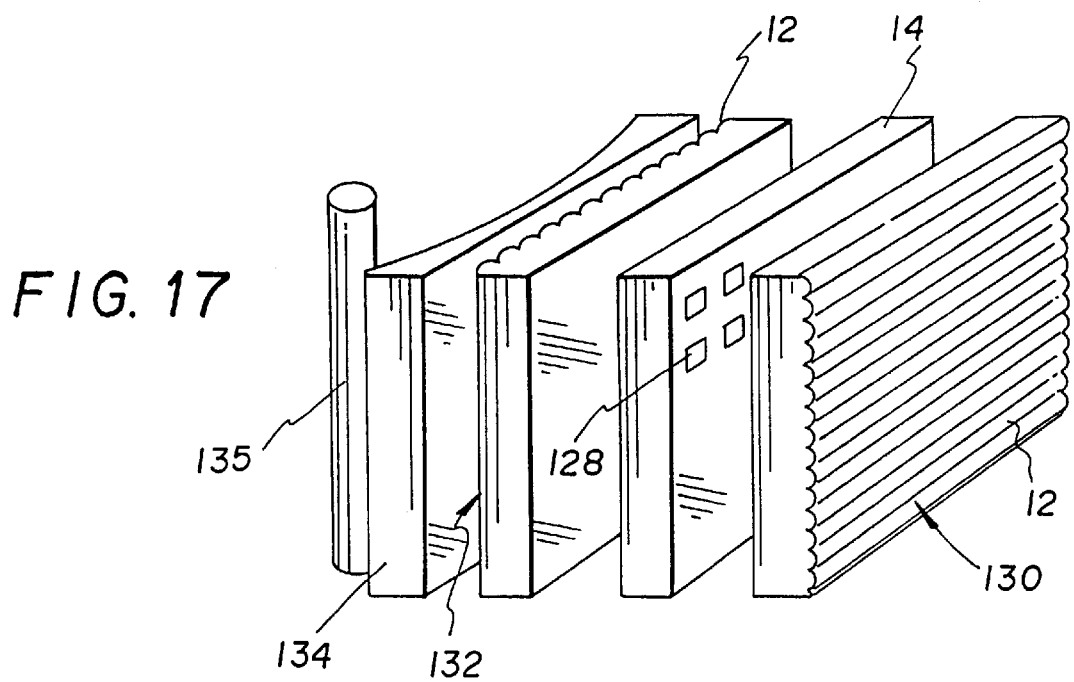
FIG. 17 illustrates the use of two lenticular screens to generate a virtual array of discrete lens elements.

One disadvantage of this approach is the need to manufacture an array of discrete lenses on the lenticular screen. FIG. 17 shows a method of overcoming this disadvantage while also significantly improving the illumination efficiency by using two lenticular screens to create a virtual array of discrete lens elements. A front lenticular screen 130 operates in a conventional manner. A back lenticular screen 132 is mounted behind the image bearing member 14 and the lenticules 12 of the back lenticular screen 132 are at an angle with respect to the lenticules 12 of the front lenticular screen 128. A condensing lens 134 images a vertical filament lamp 135 such that the rays from the condensing lens 134 are parallel and form a straight light beam when focused by the lenticules 12 of the back lenticular screen 130. Consequently the only illuminated area of the image layer 16 comprises vertical strips which are then imaged through the front lenticular screen 128, whereby only the discrete picture elements 128 are imaged. In other words, the overlapping of the lenticules 12 of the front lenticular screen and the back lenticular screen acts to define a virtual array of discrete lens elements without requiring the actual physical manufacture of the discrete lens elements. In this embodiment, it may be desirable to provide anti-halation in the front lenticular screen in order to attenuate incident reflective light, which may be incident from the ambient onto the image layer resulting in ghosting due to the visibility of unilluminated areas.

In each of the above embodiments, it is desirable to achieve accurate alignment so that the initial motion begins at the beginning of the motion cycle. In order to meet this condition, it is necessary to identify the viewer's position, especially when using lenticular material with a narrow primary angle. There are a number of ways to achieve this requirement, including putting an arrow at the side of an image before viewing begins such that it points upwards if the viewer's eye is below the start position and points downward if the viewer's eye is above the start position, thereby enabling the viewer to position his head at the start frame before initiating the display. Another more practical approach is to provide a vernier adjustment or fine adjustment so that the viewer can adjust the vertical position of the image in relation to the lenticular screen so that he sees the initial image, which can be identified by providing a first image indicia such as a small symbol in one corner of the image.

Figure 18:
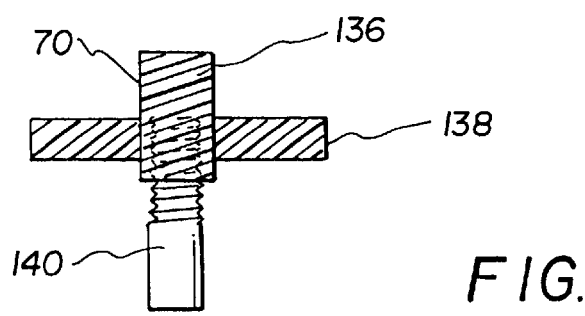
FIG. 18 illustrates vernier adjustment of the image.

To implement this vernier adjustment the shaft 74 on which the cam 72 is mounted can be adjusted by making a fine adjustment to the vertical position of the structure supporting the shaft 74. An alternative approach is to make the rod 70 extendible as shown in FIG. 18. For example, the rod 70 is configured to have a threaded exterior portion 136 that interacts with a thumb wheel 138 (shown in cross-section). As the thumb wheel 138 is turned, the exterior portion 136 of the rod 70 is caused to move up or down on a interior threaded portion 140 and rides on the cam 72. The edge of the thumb wheel 138 preferably protrudes through the front of the display unit 30. The observer would then adjust the thumb wheel 138 until he saw the starting frame or image.

The invention has been described with reference to a preferred embodiment. It will be appreciated that variations and modifications can be effected by a person of ordinary skill in the art without departing from the scope of the invention. For example, an automated vision system may be employed to sense observer position and automatically make the vernier adjustment. The scanning method employed for the array of discrete images and the vernier adjustment can also be implemented in the horizontal and vertical directions.

PARTS LIST

10 Screen
12 Lenticules
13 Low Friction Layer
14 Image Bearing Member
16 Image Layer
20 Arrow
22 Arrow
23 Barrier Screen
24 Slits
26 Illumination Source
30 Display Device
32 Front Frame
34 Viewing Area
36 Slot
38 Activation Switch
40 Reflective Layer
42 Light Ray
44 Light Ray
46 Light Ray 48 Focal Point
50 Transparent Screen
52 Flexure
54 Stationary Member
56 Spacer
58 Flexure
60 Flexure
62 Spacer
64 Flexure
66 Stationary Member
70 Rod
72 Cam
74 Shaft
76 Motor
78 Encoder
80 Audio Reproduction Device
82 Amplifier
84 Speaker
86 Headphones
90 Image Carrying Member
91 Spring
92 Slot
94 Top Portion
95 Spring Member
96 Bottom
98 Recessed Area
100 Reference Surface
102 Reference Surface
104 First Set
106 Second Set
108 Display Device
110 Slot
112 Display Device
114 Slot
116 Hand Held Viewer
118 Frame Element
120 Frame Element
122 Slot
124 Lenticular Screen
126 Discrete Lens
128 Picture Elements
130 Front Lenticular Screen
132 Back Lenticular Screen
134 Condensing Lens
135 Lamp
136 Exterior Threaded Portion
138 Thumbwheel
140 Interior Threaded Portion

What is claimed is:

1. an apparatus for displaying images comprising:

A lenticular screen; having first and second edges; an image member having first and second edges, said member being coplanar with and spaced from said lenticular screen;

a first pair of flat, planar flexures including a first flexure coupled to said first edge of said lenticular screen, a second flexure coupled to said first edge of said image member, and a spacer between said first and second flexures of said first pair of flexures;

a second pair of flat planar flexures including a third flexure coupled to said second edge of said lenticular screen, a fourth flexure coupled to said second edge said image member, and a second spacer between said third and fourth flexures of said second pair of flexures;

wherein said first and second pairs of flexures constrain parallel movement between said lenticular screen and said image member.

2. The apparatus of claim 1 including an assembly for moving said image member relative to said lenticular screen.

3. The apparatus of claim 2 including a motor for driving said assembly.

* * * * *